(12) United States Patent
Sha et al.

(10) Patent No.: US 12,407,163 B2
(45) Date of Patent: Sep. 2, 2025

(54) CIRCUIT PROTECTION DEVICE

(71) Applicant: Polytronics Technology Corp., Hsinchu (TW)

(72) Inventors: Yi-An Sha, Taipei County (TW); Chien Hui Wu, Zhudong Township, Hsinchu County (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 395 days.

(21) Appl. No.: 18/079,652

(22) Filed: Dec. 12, 2022

(65) Prior Publication Data

US 2023/0396060 A1    Dec. 7, 2023

(30) Foreign Application Priority Data

Jun. 7, 2022  (TW) .................................. 111120994

(51) Int. Cl.
*H02H 9/02*     (2006.01)
*H02H 9/04*     (2006.01)

(52) U.S. Cl.
CPC ............ *H02H 9/026* (2013.01); *H02H 9/042* (2013.01)

(58) Field of Classification Search
CPC .............................. H02H 9/026; H02H 9/042
See application file for complete search history.

(56) References Cited

U.S. PATENT DOCUMENTS

| | | | | |
|---|---|---|---|---|
| 7,119,655 B2* | 10/2006 | Starling | ................. | H01C 7/027 338/314 |
| 7,173,511 B2* | 2/2007 | Han | ...................... | H01C 1/148 338/28 |
| 9,112,348 B2* | 8/2015 | Tseng | ..................... | H02H 9/026 |
| 10,096,407 B2* | 10/2018 | Tseng | ................... | H01C 1/1406 |
| 10,804,013 B2* | 10/2020 | Tseng | ................... | H01C 1/1406 |
| 2003/0227368 A1* | 12/2003 | Huang | ................. | H01C 1/1406 338/22 R |

(Continued)

FOREIGN PATENT DOCUMENTS

| CN | 111640548 A | 9/2020 |
|---|---|---|
| TW | 202032584 A | 9/2020 |

OTHER PUBLICATIONS

CN111640548 translation (Year: 2020).*

*Primary Examiner* — Kyung S Lee
(74) *Attorney, Agent, or Firm* — Muncy, Geissler, Olds & Lowe, P.C.

(57) ABSTRACT

A circuit protection device includes a temperature sensitive resistor element, a dielectric layer, a first electrically insulating layer, a first electrode and a second electrode. The temperature sensitive resistor element has a first electrically conductive layer, a second electrically conductive layer and a positive temperature coefficient (PTC) layer disposed therebetween. The first electrically conductive layer has two electrically conductive blocks. The two electrically conductive blocks dispose on the surface of the PTC layer, thus forming a trench in the PTC layer. The dielectric layer is disposed in the trench. The first electrically insulating layer is disposed on the first electrically conductive layer and covers the dielectric layer. The first and second electrodes are disposed on the first electrically insulating layer, and electrically connected to the two electrically conductive blocks, respectively.

14 Claims, 10 Drawing Sheets

(56) References Cited

U.S. PATENT DOCUMENTS

2003/0227731 A1* 12/2003 Huang .................... H01C 7/02
                                                    361/103
2018/0075974 A1* 3/2018 Hattori .................. H01G 2/065
2020/0273609 A1* 8/2020 Tseng ...................... H01C 7/13

* cited by examiner

CIRCUIT PROTECTION DEVICE

BACKGROUND OF THE INVENTION

(1) Field of the Invention

The present application relates to a circuit protection device, and more specifically, to a circuit protection device having a dielectric material flanked by electrically conductive layers.

(2) Description of the Related Art

Because the electrical resistance of conductive composite materials having a positive temperature coefficient (PTC) characteristic is very sensitive to temperature variation, it can be used as the material for current sensing devices and has been widely applied to over-current protection devices or circuit devices. More specifically, the electrical resistance of the PTC conductive composite material remains extremely low at normal temperatures, so that the circuit or cell can operate normally. However, when an over-current or an over-temperature event occurs in the circuit or cell, the electrical resistance will instantaneously increase to a high electrical resistance state (e.g., at least above $10^4 \, \Omega$), which is the so-called "trip." Therefore, the over-current will be eliminated so as to protect the cell or the circuit device.

However, electronic apparatuses are being made smaller and smaller as time goes on, and hence each component in a circuit protection device is also reduced further in size. For this reason, the influence caused by reduction of size on electrical and structural characteristics of each component is magnified. For example, for an electrically conductive layer in the circuit protection device that may be divided into at least two electrically conductive blocks, the two electrically conductive blocks are electrically isolated from each other, and are connected to corresponding two external electrodes, respectively. Conventionally, because the circuit protection device is designed to have a large size, the two electrically conductive blocks are spaced apart from each other with a sufficiently enough long distance therebetween, and thus there is no concern of electrical insulation effect therebetween. Therefore, there is no need to control the distance between the two electrically conductive blocks and dielectric material is not required to be filled therebetween. However, as the circuit protection device is made much smaller than before, the gap between the two electrically conductive blocks becomes narrow. In the absence of the dielectric material and with a narrow gap between the two electrically conductive blocks, the circuit protection device would be easily burnt out under high applied voltage which leads to electrical arcing between the two electrically conductive blocks.

Accordingly, there is a need to prevent the above-said electrical arcing problem, and in the meantime, improve voltage endurance capability of the circuit protection device.

SUMMARY OF THE INVENTION

The present invention is aimed to adjust the distance between two electrically conductive blocks, and further fill a trench formed therebetween with a dielectric material. Thus, electrical insulation between the electrically conductive blocks is significantly improved. Therefore, gaseous discharge (i.e., electrical arcing) between the two electrically conductive blocks can be prevented, and the circuit protection device is less likely burnt out owing to the improved electrical insulation. Accordingly, the present invention improves voltage endurance capability of circuit protection device, and the circuit protection device is able to withstand higher applied voltage without burnout when compared with conventional circuit protection device.

In accordance with an aspect of the present invention, a circuit protection device includes a temperature sensitive resistor element, a dielectric layer, a first electrically insulating layer, a first electrode and a second electrode. The temperature sensitive resistor element has a positive temperature coefficient (PTC) layer, a first electrically conductive layer and a second electrically conductive layer. The PTC layer has a first surface and a second surface opposite to the first surface. The first electrically conductive layer is disposed on the first surface, and has a first electrically conductive block, a second electrically conductive block and a trench. The first electrically conductive block is electrically isolated and spaced apart from the second electrically conductive block at a distance by the trench. The second electrically conductive layer is disposed on the second surface. The dielectric layer is disposed in the trench. The first electrically insulating layer is disposed on the first electrically conductive layer and covers the dielectric layer. The first electrode and a second electrode are disposed on the first electrically insulating layer, and electrically connected to the first electrically conductive block and the second electrically conductive block, respectively.

In an embodiment, the temperature sensitive resistor element further includes a first conductive member, a left end, and a right end opposite to the left end. The left end has a first notch extending across the first electrically conductive layer, the PTC layer and the second electrically conductive layer, and the first conductive member is disposed in the first notch.

In an embodiment, the dielectric layer extends along a first direction between the first electrode and the second electrode, and the first direction is parallel to the first electrode and the second electrode.

In an embodiment, the trench has a bottom surface and a sidewall, and the bottom surface extends on the first surface and perpendicularly connects to the sidewall.

In an embodiment, the trench has a bottom surface and a sidewall, and the bottom surface extends on the first surface and non-perpendicularly connects to the sidewall.

In an embodiment, the dielectric layer is in direct contact with the sidewall and extends along the first direction. The sidewall and the bottom surface are entirely covered by the dielectric layer, and the trench is entirely filled with the dielectric layer.

In an embodiment, the dielectric layer is in direct contact with the sidewall and extends along the first direction. The bottom surface is partially covered by the dielectric layer, and a gap is formed in the trench.

In an embodiment, the dielectric layer is in direct contact with the sidewall and extends along the first direction. The sidewall and the bottom surface are entirely covered by the dielectric layer, and a gap is formed in the trench.

In an embodiment, the circuit protection device further includes a first electrically insulating member entirely covering the first conductive member.

In an embodiment, the temperature sensitive resistor element further includes a second conductive member. The left end has a second notch extending across the first electrically conductive layer, the PTC layer and the second electrically conductive layer, and the second conductive member is disposed in the second notch.

In an embodiment, the circuit protection device further includes a second electrically insulating member entirely covering the second conductive member.

In an embodiment, the left end has a first corner and a second corner located on opposite ends of the left end. The first notch is disposed on the first corner, and the second notch is disposed on the second corner.

In an embodiment, the circuit protection device further includes a second electrically insulating layer disposing on the second electrically conductive layer.

In an embodiment, the first electrically conductive layer has a long side parallel to the distance. If the total length of the long side is calculated as 100%, the distance ranges from 7% to 46%.

In an embodiment, the distance ranges from 0.08 mm to 0.5 mm.

In an embodiment, the dielectric strength of the dielectric layer is higher than the dielectric strength of the first electrically insulating layer.

In an embodiment, the dielectric layer has a material selected from the group consisting of epoxy resin, polyester resin, polyamide resin, phenolic resin, epoxy resin with glass fiber or inorganic filler, phenolic resin with glass fiber or inorganic filler, polyurethane resin, polycyanate resin, maleimide resin, polyolefin resin, polyphenylene oxide resin, silicone polymer, acrylic resin, photopolymer resin, inorganic glue, and combinations thereof.

In an embodiment, the dielectric layer is made of epoxy resin with inorganic filler, and the first electrically insulating layer is made of epoxy resin.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
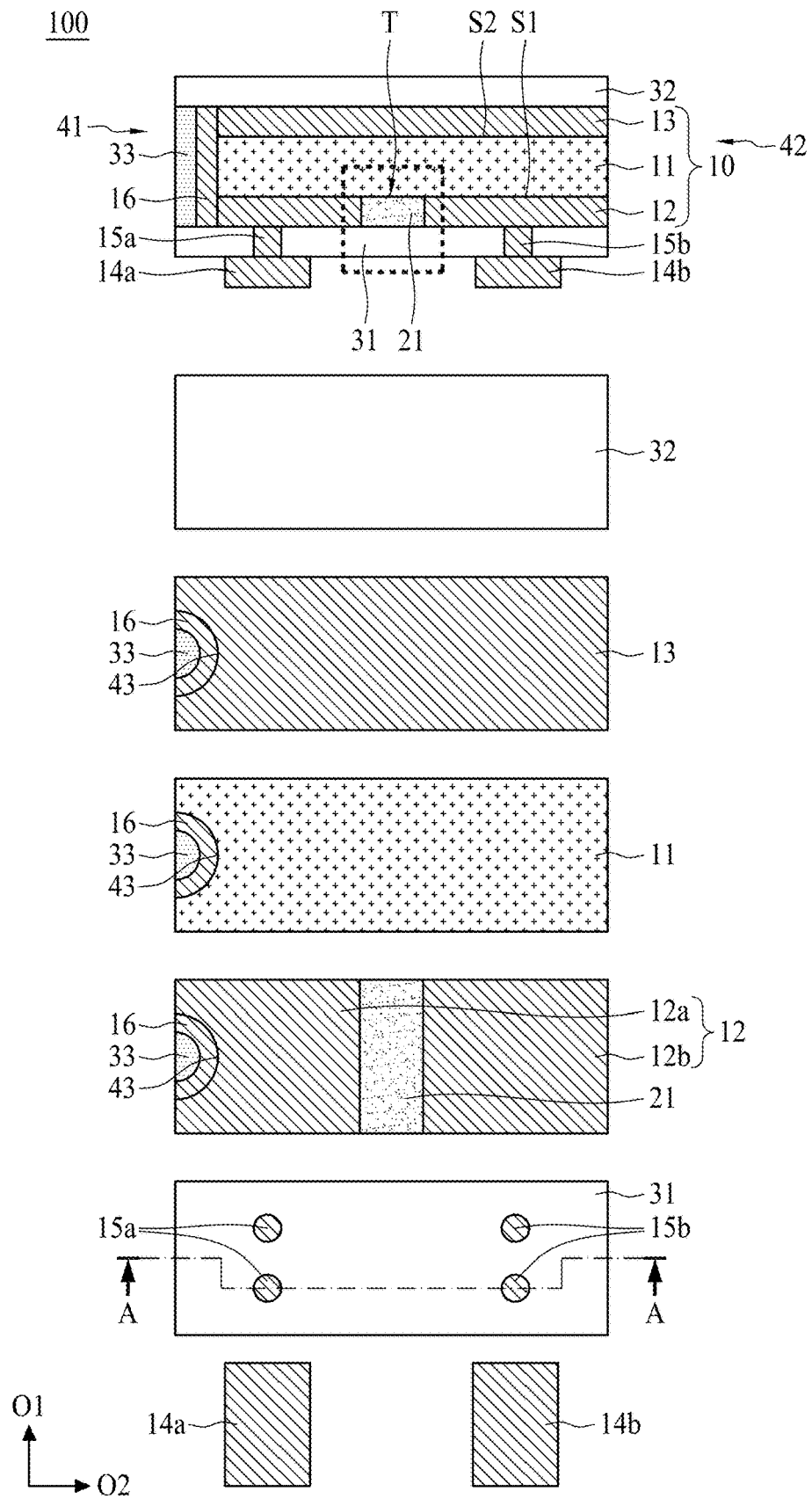
FIG. 1 shows a cross-sectional view of a circuit protection device and top views illustrating each layer of the circuit protection device in accordance with a first aspect of the present invention.
Figure 2:
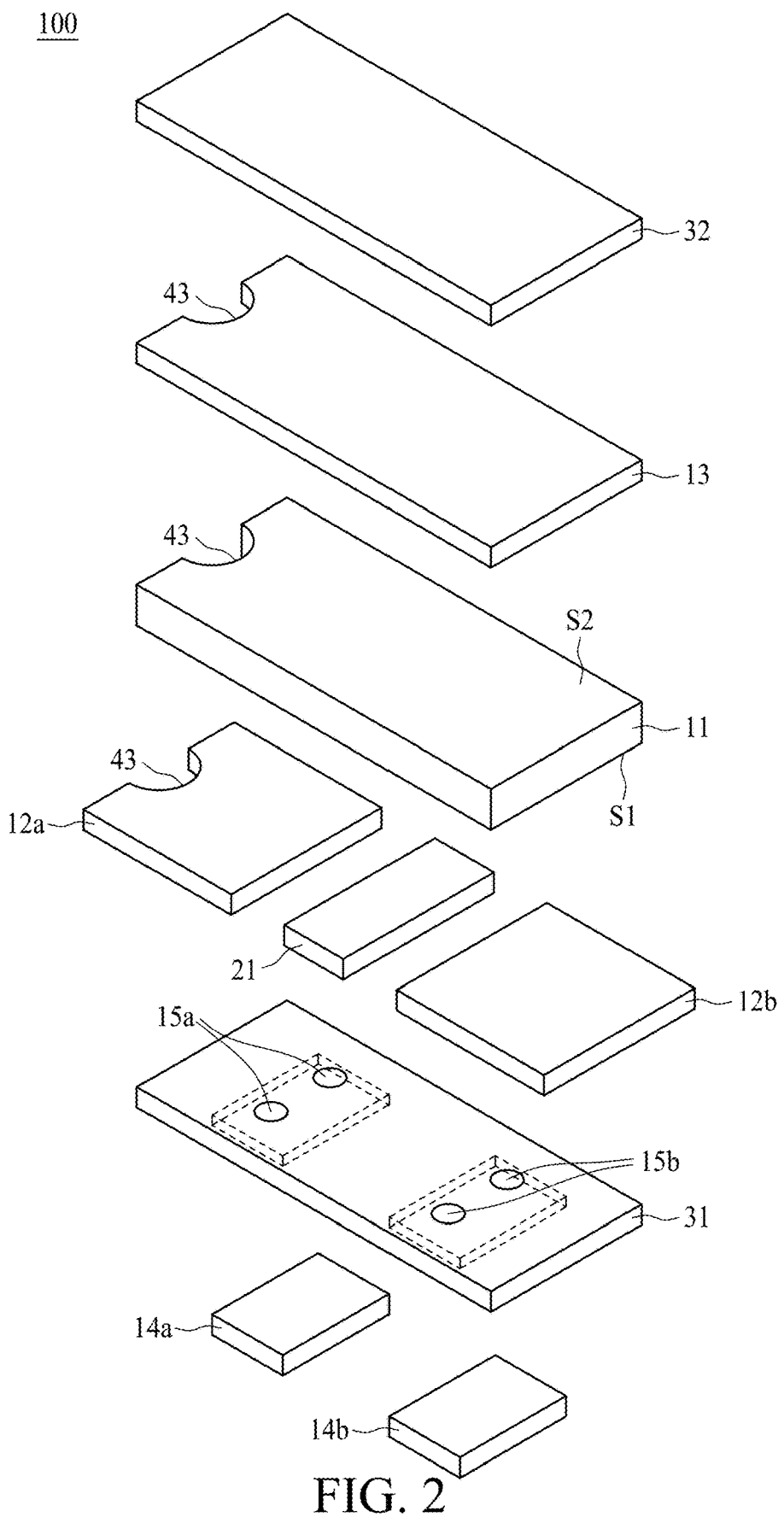
FIG. 2 shows an exploded view of the circuit protection device shown in FIG. 1.

Please refer to FIG. 1 and FIG. 2. The topmost figure in FIG. 1 shows a cross-sectional view of a circuit protection device 100 in accordance with a first aspect of the present invention, and the other figures show top views illustrating each layer thereof. For ease of understanding, a dashed line AA is added in the top view figure of a first electrically insulating layer 31, and the cross-sectional view of the circuit protection device 100 is obtained by taking along the dashed line AA after assembly of all layers. Moreover, a first direction O1 and a second direction O2 represent two directions in top view, as shown in FIG. 1. The first direction O1 is parallel to the width (short side) of the circuit protection device 100, and the second direction O2 is parallel to the length (long side) of the circuit protection device 100. The first direction O1 is perpendicular to the second direction O2. FIG. 2 shows an exploded view of the circuit protection device 100, and omits a conductive member 16 and an electrically insulating member 33 shown in FIG. 1. In the first aspect of the present disclosure, the circuit protection device 100 includes a temperature sensitive resistor element 10, a dielectric layer 21, a first electrically insulating layer 31, a first electrode 14a, a second electrode 14b and other components.

The temperature sensitive resistor element 10 has a positive temperature coefficient (PTC) layer 11, a first electrically conductive layer 12 and a second electrically conductive layer 13. The PTC layer 11 has a first surface S1 and a second surface S2. The first surface S1 and the second surface S2 are on opposite surfaces of the PTC layer 11. The first electrically conductive layer 12 is disposed on the first surface S1 of the PTC layer 11. The first electrically conductive layer 12 has a first electrically conductive block 12a, a second electrically conductive block 12b and a trench T. The first electrically conductive block 12a is electrically isolated and spaced apart from the second electrically conductive block 12b at a distance D (as shown in FIG. 3a to FIG. 5c) by the trench T. The second electrically conductive layer 13 is disposed on the second surface S2 of the PTC layer 11. In this way, the PTC layer 11, the first electrically conductive layer 12 and the second electrically conductive layer 13 together form the basic structure of the temperature sensitive resistor element 10 of the circuit protection device 100. In an embodiment, the PTC layer 11 may consists of polymeric positive temperature coefficient (PPTC) material, including a polymer matrix and a conductive filler dispersed in the polymer matrix. The polymer matrix may be polyethylene, polypropylene, polyvinyl fluoride, mixture, or copolymer thereof. The conductive filler may be carbon-containing filler, metal filler, metal carbide filler, metal boride filler, metal nitride filler, or combinations thereof. It is noted that, alternatively, the temperature sensitive resistor element 10 may be other types of temperature sensitive resistor elements, such as negative temperature coefficient (NTC) element. In another embodiment, the temperature sensitive resistor element 10 may include other components, or be formulated with different materials in order to adjust its sensitivity to temperature.

Figure 3A:
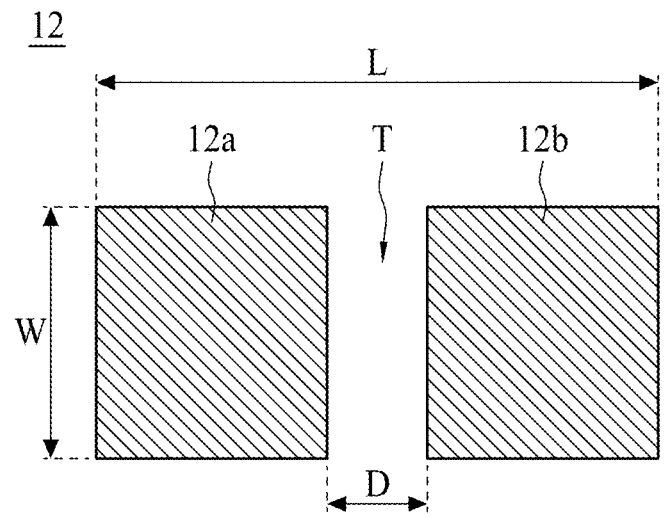
FIG. 3a shows a first electrically conductive layer shown in FIG. 1 in accordance with an embodiment.
Figure 3B:
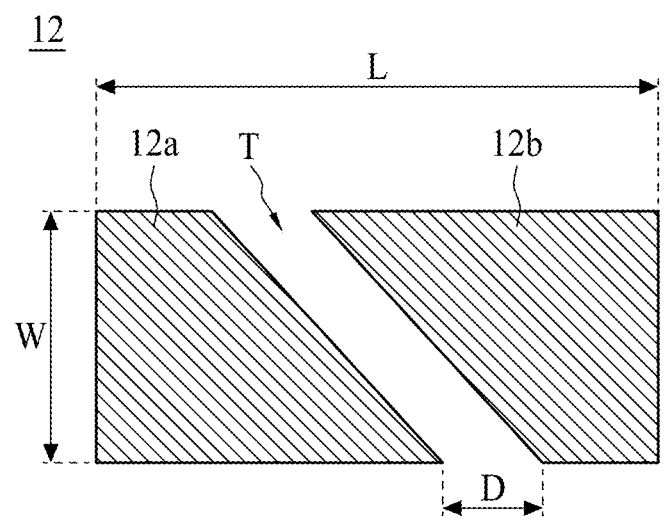
FIG. 3b shows a first electrically conductive layer shown in FIG. 1 in accordance with an alternative embodiment.

Please refer to FIG. 3a and FIG. 3b, in which the first electrically conductive layer 12 as shown in FIG. 1 is illustrated in top view and exemplified with different designs. In FIG. 3a, the first electrically conductive layer 12 has a long side L and a short side W, and is divided into the first electrically conductive block 12a and the second electrically conductive block 12b. The length of the long side L multiplied by the length of the short side W equals to the top-view area of the first electrically conductive layer 12. The first electrically conductive block 12a and the second electrically conductive block 12b are substantially rectangular. The first electrically conductive block 12a is spaced apart from the second electrically conductive block 12b at the distance D, by which the first electrically conductive block 12a is electrically isolated from the second electrically conductive block 12b. The first electrically conductive block 12a and the second electrically conductive block 12b has opposite sides facing and substantially parallel to each other with the distance D. That is, distances D measured between the opposite sides are all the same along the direction of the short side W. Because of the distance D, the trench T is formed when the first electrically conductive layer 12 is disposed on the first surface S1 of the PTC layer 11, as shown in FIG. 1.

In FIG. 3b, the long side L, the short side W and the distance D are discussed above, and are not described in detail herein. Compared with FIG. 3a, either the first electrically conductive block 12a or the second electrically conductive block 12b has a different shape, which is substantially trapezoidal. The trench T is not parallel to but extends diagonally relative the short side W when the first electrically conductive layer 12 is disposed on the first surface S1 of the PTC layer 11. If the top-view area and the distance D of the first electrically conductive layer 12 in FIG. 3a are the same with that in FIG. 3b, the electrical resistance of the first electrically conductive layer 12 in FIG. 3a is lower than the electrical resistance of the first electrically conductive layer 12 in FIG. 3b. Because of the diagonal extension of the distance D in FIG. 3b, the top-view area of the trench T in FIG. 3b is larger than that of the trench T in FIG. 3a. In other words, the top-view area of the first electrically conductive block 12a and the second electrically conductive block 12b is relatively smaller. More specifically, electrical resistance formula R=ρ×L/A is provided herein for reference. "R" stands for electrical resistance; "ρ" stands for electrical resistivity; "L" stands for thickness; and "A" stands for cross sectional area. According to the formula, the electrical resistance is in inverse proportion to the cross sectional area if electrical resistivity and the thickness are fixed as constant values. That is, the larger the cross sectional area, the higher the current flow and the lower the electrical resistance will be. Compared with the circuit protection device in FIG. 3b, the circuit protection device in FIG. 3a may allow more current to flow therethrough. It is understood that the shape of the first electrically conductive block 12a and the second electrically conductive block 12b may be varied depending on the requirements. For example, the design of the distance D (i.e., the shape of the trench T) may be S-shaped, <-shaped, C-shaped, zigzag-shaped, half-rounded, half-elliptical, or other shapes of design which may separate the first electrically conductive block 12a from the second electrically conductive block 12b.

Figure 4A:
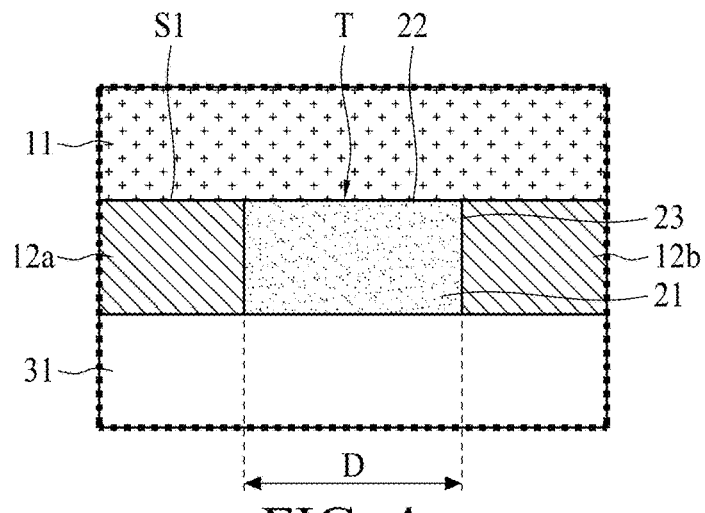
FIG. 4a to FIG. 4c show enlarged sectional views of the circuit protection device shown in FIG. 1 with different embodiments.
Figure 4B:
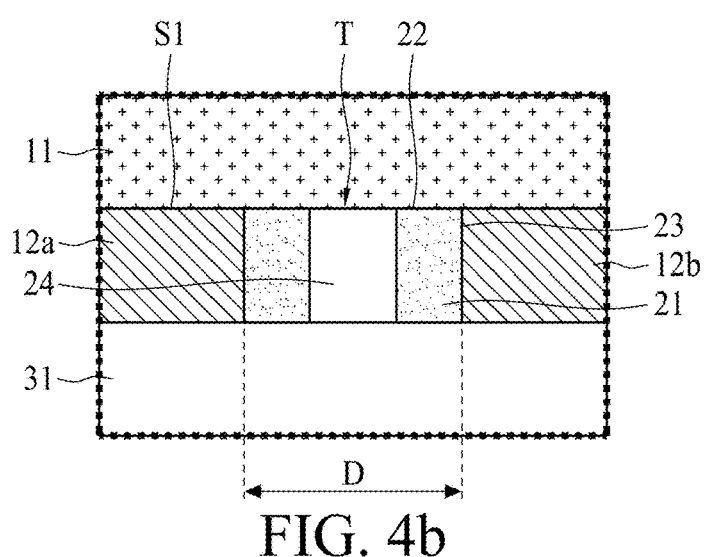
Figure 4C:
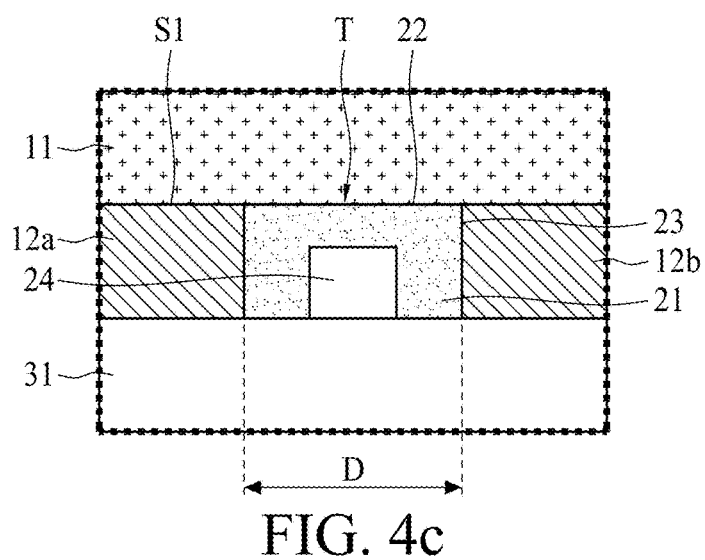

Please refer to the FIG. 4a to FIG. 4b. FIG. 4a shows an enlarged sectional view of the circuit protection device 100 shown in FIG. 1. FIG. 4b and FIG. 4c show enlarged sectional views of the circuit protection device 100 shown in FIG. 1 in accordance with alternative embodiments. Besides the distance D described above, the present disclosure further disposes the dielectric layer 21 in the trench T. In FIG. 4a, the trench T has a bottom surface 22 and a sidewall 23, and the bottom surface 22 extends on the first surface S1 and perpendicularly connects to the sidewall 23. The trench T is formed when the first electrically conductive layer 12 is disposed on the first surface S1 of the PTC layer 11. Technically, the trench T is the space enclosed by the first electrically conductive block 12a, the second electrically conductive block 12b and the PTC layer 11. The bottom surface 22 of the trench T is substantially coplanar with the first surface S1 of the PTC layer 11. The sidewall 23 of the trench T is substantially formed of the sidewall of the first electrically conductive block 12a and the sidewall of the second electrically conductive block 12b. The bottom surface 22 perpendicularly connects to the sidewall 23 of the trench T, both of which extend along the first direction O1 as shown in FIG. 1. The dielectric layer 21 is in direct contact with the sidewall 23 and extends along the first direction O1 when the dielectric layer 21 fills in the trench T. The sidewall 23 and the bottom surface 22 of the trench T are entirely covered by the dielectric layer 21, and the trench T is entirely filled with the dielectric layer 21. In this case, the shape of the dielectric layer 21 is totally the same as the shape of the trench T because the dielectric layer 21 fills entire space of the trench T.

Referring to FIG. 4a again, the distance D between the first electrically conductive block 12a and the second electrically conductive block 12b remains constant. That is, the sidewall 23 on the first electrically conductive block 12a is parallel to the sidewall 23 on the second electrically conductive block 12b. If the total length of the long side L is calculated as 100%, the distance D ranges from 7% to 46%. If the ratio of the distance D (also called distance ratio hereinafter) is lower than 7%, the first electrically conductive block 12a and the second electrically conductive block 12b are too close, which may lead to electrical breakdown between the first electrically conductive block 12a and the second electrically conductive block 12b. In other words, electrical arcing may occur owing to the lower distance ratio. In addition, the dielectric layer 21 cannot provide sufficient electrical insulation under such lower distance ratio (<7%) even if the trench T is filled with the dielectric layer 21. If the distance ratio is higher than 46%, the total top-view surface of the first electrically conductive block 12a and the second electrically conductive block 12b is too small to be properly aligned with a first via 15a and a second via 15b. Under the higher distance ratio, the electrical resistance is also relatively higher, and thus it decreases the amount of current flow. In the present disclosure, for example, if the length of the long side L is 1.1 mm and the length of the short side W is 0.61 mm, the distance D may be mm to 0.5 mm. In an embodiment, the distance ratio may be 7.27% to 9.09% to 45.45%, 13.64% to 45.45%, 18.18% to 45.45%, 22.73% to 45.45%, 31.82% to 45.45%, or 36.36% to 45.45%. In an embodiment, the distance ratio may be 31.81% to 45.45%. In an embodiment, the distance ratio may be 36.36% to 45.45%. In an embodiment, the distance D may be 0.08 mm to 0.5 mm, 0.1 mm to 0.5 mm, 0.15 mm to 0.5 mm, 0.2 mm to 0.5 mm, 0.25 mm to 0.5 mm, 0.3 mm to 0.5 mm, 0.35 mm to 0.5 mm, or 0.4 mm to 0.5 mm. In an embodiment, the distance D may be 0.35 mm to 0.5 mm. In an embodiment, the distance D may be 0.4 mm to 0.5 mm.

Moreover, the dielectric layer 21 to be filled in the trench T may be selectively adjusted. That is, the trench T can be entirely or partially filled with the dielectric layer 21. Please refer to the following details.

In FIG. 4b, the first electrically conductive block 12a, the second electrically conductive block 12b, the distance D and the trench T are the same as that in FIG. 4a, and are not described in detail herein. Compared with FIG. 4a, the trench T is not entirely filled with the dielectric layer 21 so that a gap 24 is formed as shown in FIG. 4b. In the circuit protection device 100, electrical arcing comes from gaseous discharge (e.g., through air) between the first electrically conductive block 12a and the second electrically conductive block 12b. More specifically, if the voltage difference between the sidewall 23 on the first electrically conductive block 12a and the sidewall 23 on the second electrically conductive block 12b becomes sufficiently great, an electrical current flows through the air from one side to the other side of the sidewall 23 and a high-energetic arc occurs, which makes the circuit protection device 100 burnt out. Accordingly, in this alternative embodiment, the dielectric layer 21 merely covers the key region where the electrical arcing originates, that is, both sides of the sidewall 23 of the trench T. In other words, the dielectric layer 21 entirely covers the sidewall 23 of the trench T and extends along the first direction O1, and the bottom surface 22 of the trench T is partially covered by the dielectric layer 21 so that a gap 24 is formed in the trench T. The first surface S1 of the PTC layer 11 is partially exposed in the gap 24. Compared with FIG. 4a, the design in FIG. 4b coats the dielectric layer 21 only on the exposed sides of the first electrically conductive block 12a and the second electrically conductive block 12b, and therefore saves the excessive use of the dielectric layer 21 in the process.

In FIG. 4c, the first electrically conductive block 12a, the second electrically conductive block 12b, the distance D and the trench T are the same as that in FIG. 4b, and are not described in detail herein. Compared with FIG. 4b, the bottom surface 22 of the trench T is further covered with the dielectric layer 21 but the gap 24 still exists as shown in FIG. 4c. As described above, two terminals between the conductors (i.e., the first electrically conductive block 12a and the second electrically conductive block 12b) may lead to electrical arcing if the voltage difference is sufficient, and hence the dielectric layer 21 is used for the purpose of electrical insulation. However, it should be noted that the PTC layer 11 has the conductive filler, which means that the PTC layer 11 is also an electrical conductor before trip of the circuit protection device 100. The environmental factors may compromise the electrical characteristics of the PTC layer 11 if the bottom surface 22 is not entirely covered with the dielectric layer 21; or in other case, the current may leak out and flow into the gap 24 through the interface between the dielectric layer 21 and the bottom surface 22 if the interface is not perfectly sealed therebetween under electrical breakdown. Therefore, the dielectric layer 21 may further entirely cover the bottom surface 22 of the trench T, so that the exposed region of the PTC layer 11 is sealed in the trench T. Compared with FIG. 4b, the bottom surface 22 and the sidewall 23 of the trench T are entirely covered with the dielectric layer 21, but the gap 24 is still remained as shown in FIG. 4c. In this way, the design in FIG. 4c further enhances the electrical insulation while saving the excessive use of the dielectric layer 21 in the process.

Moreover, the width of the trench T may be adjusted depending on the process requirements.

Figure 5A:
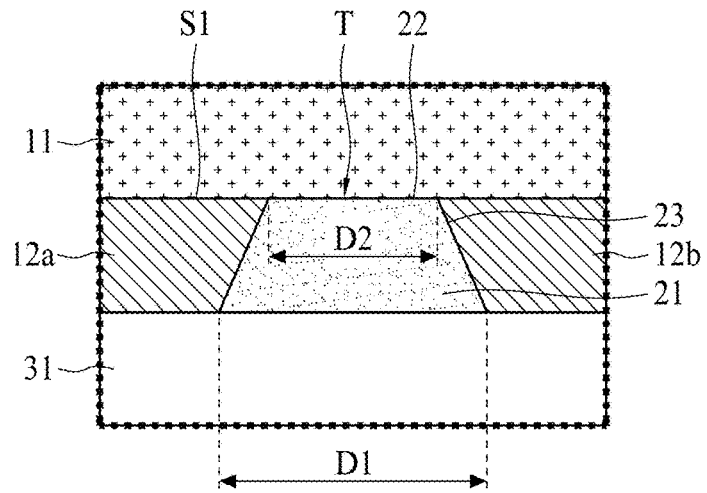
FIG. 5a to FIG. 5c show enlarged sectional views of the circuit protection device shown in FIG. 1 with different embodiments.
Figure 5B:
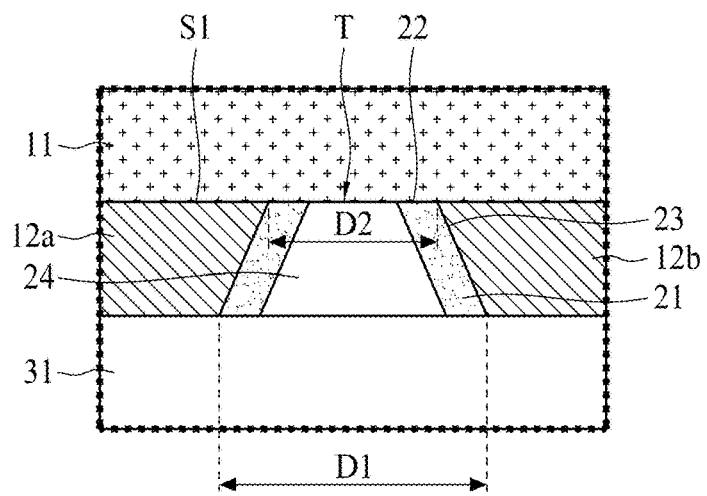
Figure 5C:
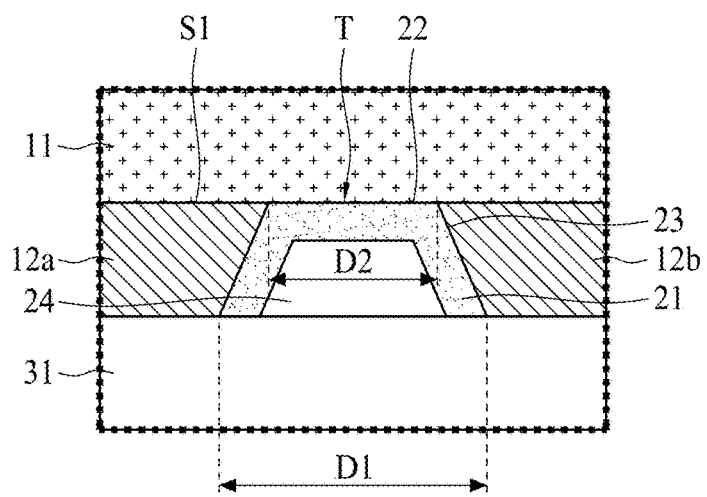

Please refer to FIG. 5a to FIG. 5c, the trench T has a wider bottom and a narrower top between the first electrically conductive block 12a and the second electrically conductive block 12b. That is, the sidewall 23 on the first electrically conductive block 12a is not parallel to the sidewall 23 on the second electrically conductive block 12b. In FIG. 5a to FIG. 5c, the trench T has the bottom 22 and the sidewall 23, and the bottom 22 which is coplanar with the first surface S1 non-perpendicularly connects to the sidewall 23. The trench T tapers from bottom to top, by which a first distance D1 is measured at an opening thereof (i.e., the interface between the first electrically insulating layer 31 and the trench T) and a second distance D2 is measured at the bottom 22. The first distance D1 and the second distance D2 may range the same as described in FIG. 4a, but the premise is that the first distance D1 is longer than the second distance D2. The first distance D1 and the second distance D2 may range from 7% to 46% in respect of the distance ratio. For example, the distance ratio of the first distance D1 needs to be higher than 7% if the distance ratio of the second distance D2 is 7%. Accordingly, the structure of the trench T forms the wider bottom and the narrower top as shown in FIG. 5a to FIG. 5c. When the first electrically conductive layer 12 is disposed on the surface S1 of the PTC layer 11, the trench T has the wider opening, and it is beneficial to the filling process of the dielectric layer 21 during the manufacture of the circuit protection device 100.

As described above, the sidewall 23 of the trench T in FIG. 5a to FIG. 5c is different from that in FIG. 4a to FIG. 4c. The trench T in FIG. 5a to FIG. 5c tapers in width (from the first distance D1 to the second distance D2), and the trench T in FIG. 4a to FIG. 4c remains constant in width (the distance D). However, both the design of FIG. 5a to FIG. 5c and FIG. 4a to FIG. 4c use the same coating configuration of the dielectric layer 21. FIG. 5a corresponds to FIG. 4a, and therefore the trench T is entirely filled with the dielectric layer 21. That is, the dielectric layer 21 fills in all the space of the trench T, and has the shape the same as the trench T. FIG. 5b corresponds to FIG. 4b, and only the sidewall 23 of the trench T is entirely covered with the dielectric layer 21. The bottom surface 22 is exposed and the gap is formed. That is, the dielectric layer 21 is in direct contact with the sidewall 23 and extends along the first direction O1, and the bottom surface 22 is partially covered by the dielectric layer 21 so that the gap 24 is formed in the trench T. FIG. 5c corresponds to FIG. 4c, the sidewall 23 and the bottom surface 22 of the trench T are entirely covered by the dielectric layer 21, and the gap 24 is still remained. That is, the dielectric layer 21 is in direct contact with the sidewall 23 and extends along the first direction O1, the sidewall 23 and the bottom surface 22 are entirely covered by the dielectric layer 21, and the gap 24 is remained in the trench T. Accordingly, the coating configuration of FIG. 5a to FIG. 5c corresponds to the coating configuration of FIG. 4a to FIG. 4c. Besides the advantages mentioned in FIG. 4a to FIG. 4c., the embodiments in FIG. 5a to FIG. 5c are beneficial to the filling process of the dielectric layer 21, by which the convenience of the filling process is achieved. In an embodiment, the dielectric layer 21 may be a material selected from the group consisting of epoxy resin, polyester resin, polyamide resin, phenolic resin, epoxy resin with glass fiber or inorganic filler, phenolic resin with glass fiber or inorganic filler, polyurethane resin, polycyanate resin, maleimide resin, polyolefin resin, polyphenylene oxide resin, silicone polymer, acrylic resin, photopolymer resin, inorganic glue, and combinations thereof.

Please refer to FIG. 1 again. In order to decrease the influence of environment on the circuit protection device 100, the internal electrode (e.g., the first electrically conductive layer 12 and the second electrically conductive layer 13) is often covered with materials for electrical insulation. Conductive vias penetrate the materials for electrical insulation so as to connect to the external electrode. The materials for electrical insulation may refer to the first electrically insulating layer 31 and the second electrically insulating layer 32, both of which may consist of thermosetting prepregs after curing. The first electrically conductive layer 12 is disposed on the first electrically conductive layer 12 and covers the dielectric layer 21. The second electrically insulating layer 32 is disposed on the second electrically conductive layer 13. The interface between the first electrically insulating layer 31 and the first electrically conductive layer 12 is substantially coplanar with the interface between the first electrically insulating layer 31 and the dielectric layer 21. For the purpose of electrically connection to the external electrode, the first via 15a and the second via 15b penetrate the first electrically insulating layer 31. The first via 15a and the second via 15b may be plating through holes (PTH), or other conductive holes formed by suitable connection methods for electrical connection. In an embodiment, the first via 15a and the second via 15b may be conductive holes filled with solid metal, or conductive holes with hollow structure. Although the number of the first via 15a is two as shown in FIG. 1, it is intended to be illustrative only and the number is not limited thereto. In the present disclosure, the number of the first via 15a is not limited to two, it may also be one, three, more than three, or other designs may be used. The so-called "other designs" may be, for example: the top-view area of the first via 15a extends from its location illustrated in FIG. 1 to the left edge of the first electrically insulating layer 31. The material of first electrically insulating layer 31 may be the same as or different from the material of the second electrically insulating layer 32. Under certain circumstances, the dielectric layer 21 may consist of the material with higher dielectric strength for the enhancement of electrical insulation between the first electrically conductive block 12a and the second electrically conductive block 12b. In an embodiment, the dielectric strength of the dielectric layer 21 is higher than the dielectric strength of the first electrically insulating layer 31. For example, the epoxy resin may mix with alumina microparticles or nanoparticles (or other oxide fillers) to form an epoxy composite, thereby enhancing the dielectric strength. In an embodiment, the first electrically insulating layer 31 may consist of the epoxy resin, and the dielectric layer 21 may consist of the aforementioned epoxy composite, thereby preventing electrical arcing from occurring.

Please refer to FIG. 1 and FIG. 2, the first electrode 14a and the second electrode 14b are disposed on the first electrically insulating layer 31, and are electrically connected to the first electrically conductive block 12a and the second electrically conductive block 12b through the first via 15a and the second via 15b, respectively. In FIG. 2, two frames in dashed lines illustrate the location where the first electrode 14a and the second electrode 14b dispose below the first electrically insulating layer 31. The dielectric layer 21 extends along the first direction O1 between the first electrode 14a and the second electrode 14b. The first direction O1 is substantially parallel to the first electrode 14a and the second electrode 14b. The second direction O2 is perpendicular to the first direction O1, and is substantially parallel to the long side L of the first electrically conductive layer 12 (as refer to FIG. 3a and FIG. 3b). Accordingly, the dielectric layer 21 extends along the first direction O1 perpendicular to the long side L of the first electrically conductive layer 12, and penetrates the first electrically conductive layer 12 from one side to another side.

In the first aspect of FIG. 1, the temperature sensitive resistor element 10 further includes a conductive member 16, a left end 41, and a right end 42 opposite to the left end 41. The left end 41 has a notch 43 extending across the first electrically conductive layer 12, the PTC layer 11 and the second electrically conductive layer 13, and the conductive member 16 is disposed in the notch 43. More specifically, the temperature sensitive resistor element 10 has two opposite ends (i.e., the left end 41 and the right end 42), and the notch 43 is only disposed on the left end 41. The notch 43 is substantially at the center of the left end 41. As the notch 43 is formed, the conductive member 16 can be coated on it, and make the first electrically conductive block 12a electrically connected to the second electrically conductive layer 13. The conductive member 16 is substantially half-rounded. In some embodiments, the conductive member 16 may be half-elliptical or even wrap around a full sidewall surface. In this way, the first electrode 14a connects to the first electrically conductive block 12a, the conductive member 16 and the second electrically conductive layer 13 through the first via 15a, so as to form one conductive path. The second electrode 14b connects to the second electrically conductive block 12b through the second via 15b, so as to form another conductive path.

Moreover, in order to decrease the influence of environment (e.g., humidity, oxygen, organic solvent, temperature, or other similar factors), the circuit protection device 100 may further include an electrically insulating member 33. The electrically insulating member 33 corresponds to the position of the notch 43, and entirely covers the conductive member 16. The material of the electrically insulating member 33 may be the same as or different from that of the first electrically insulating layer 31 (or the second electrically insulating layer 32). If the conductive member 16 is half-rounded, the center of it forms a recess which allows the electrically insulating member 33 to be filled with ease. In addition, the first electrically insulating layer 31 and the second electrically insulating layer 32 cover over the notch 43, by which the electrically insulating member 33 is clamped from top and bottom, and the structure of the electrically insulating member 33 can be fixed steadily. More specifically, the conductive member 16, the bottom insulating layer (the first electrically insulating layer 31) and the top insulating layer (the second electrically insulating layer 32) together form recessive space for accommodation for the electrically insulating member 33 after disposing the conductive member 16 in the notch 43. Besides, the first electrically insulating layer 31 covers over the notch 43 during lamination since the length of the first electrically insulating layer 31 is substantially the same as that of the first electrically conductive layer 12. In top view, the notch 43 has a half-rounded boundary, and the first electrically insulating layer 31 extends along the second direction O2 and over the center of the half-rounded boundary of the notch 43. Configuration between the second electrically insulating layer 32 and the notch 43 is the same as the configuration between the first electrically insulating layer 31 and the notch 43 as described above. The influence of environmental factors can be effectively blocked due to the package of the first electrically insulating layer 31, the second electrically insulating layer 32 and the electrically insulating member 33. In the meantime, the distance D is adjusted to the suitable range while the dielectric layer 21 is filled in the trench T, by which the electrical insulation is further enhanced and the issue of electrical arcing is addressed. In this way, voltage endurance capability of the circuit protection device 100 can be improved. In addition to the first aspect of FIG. 1, the present disclosure may apply to various circuit protection devices, and details are described below.

Figure 6:
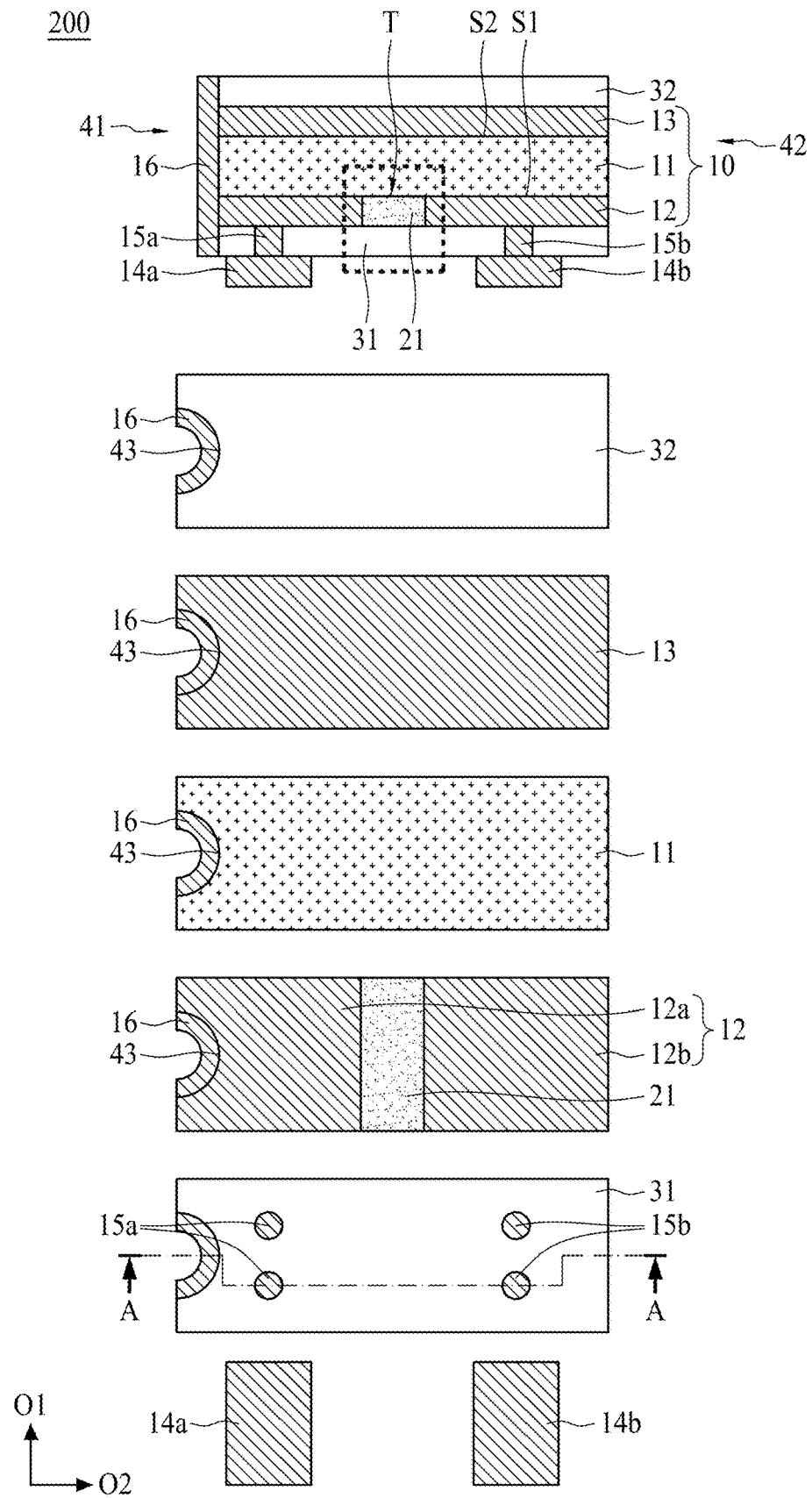
FIG. 6 shows a cross-sectional view of a circuit protection device and top views illustrating each layer of the circuit protection device in accordance with a second aspect of the present invention.

Please refer to FIG. 6, it shows a cross-sectional view of a circuit protection device 200 and top views illustrating each layer of the circuit protection device 200 in accordance with a second aspect of the present invention. The cross-sectional view of the circuit protection device 200 is obtained by taking along the dashed line AA after assembly of all layers. In FIG. 6, the temperature sensitive resistor element 10, the PTC layer 11, the first electrically conductive layer 12, the first electrically conductive block 12a, the second electrically conductive block 12b, the second electrically conductive layer 13, the first electrode 14a, the second electrode 14b, the first via 15a, the second via 15b, the dielectric layer 21, the trench T, the first electrically insulating layer 31, the second electrically insulating layer 32, the position of the notch 43, the conductive member 16, materials and the distance ratio are the same as described in FIG. 1, and are not described in detail. Compared with FIG. 1, the extension of the notch 43 in FIG. 6 is different. In FIG. 6, the notch 43 further extends to the first electrically insulating layer 31 and the second electrically insulating layer 32 at the left end 41. Correspondingly, the conductive member 16 may further extend to the first electrically insulating layer 31 and the second electrically insulating layer 32 at the left end 41 but without covering with the electrically insulating member 33 of FIG. 1. The recessive structure still exists owing to the conformal extension of the conductive member 16 on the notch 43. In this way, the conductive member 16 can be used as a passage for solder climbing when welding the circuit protection device 200, and therefore electrical connection and welding strength can be improved.

Figure 7:
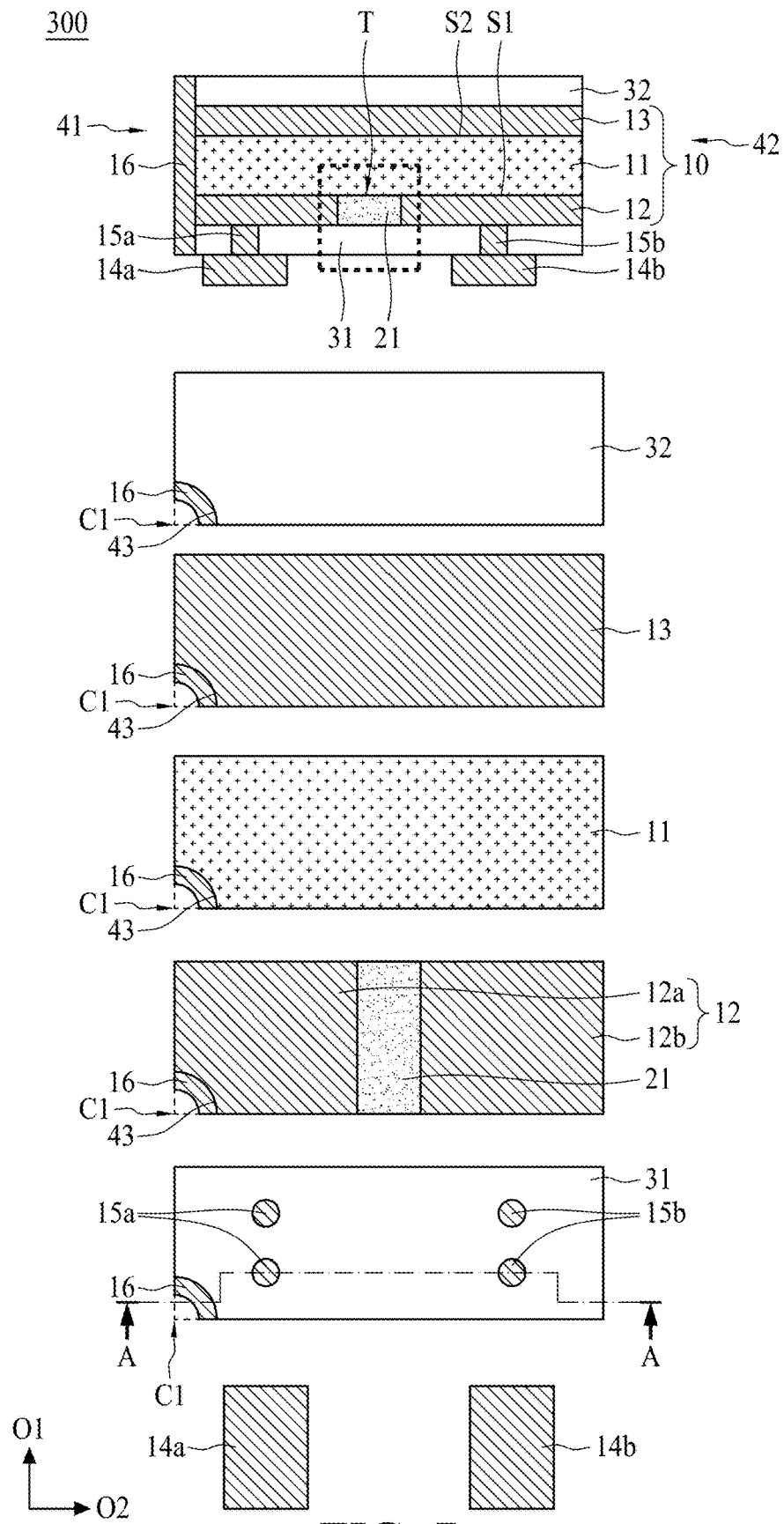
FIG. 7 shows a cross-sectional view of a circuit protection device and top views illustrating each layer of the circuit protection device in accordance with a third aspect of the present invention.

Please refer to FIG. 7, it shows a cross-sectional view of a circuit protection device 300 and top views illustrating each layer of the circuit protection device 300 in accordance with a third aspect of the present invention. The cross-sectional view of the circuit protection device 300 is obtained by taking along the dashed line AA after assembly of each layer. In FIG. 7, the temperature sensitive resistor element 10, the PTC layer 11, the first electrically conductive layer 12, the first electrically conductive block 12a, the second electrically conductive block 12b, the second electrically conductive layer 13, the first electrode 14a, the second electrode 14b, the first via 15a, the second via 15b, the dielectric layer 21, the first electrically insulating layer 31, the second electrically insulating layer 32, the extension of the notch 43, the conductive member 16, the trench T, materials and the distance ratio are the same as described in FIG. 6, and are not described in detail. Compared with FIG. 6, the notch 43 in FIG. 7 is disposed on the corner of each layer (i.e., the first electrically insulating layer 31, the first electrically conductive layer 12, the PTC layer 11, the second electrically conductive layer 13 or the second electrically insulating layer 32). More specifically, in FIG. 7, the notch 43 of the circuit protection device 300 is only disposed at the left end 41, and locates at the first corner C1 of the left end 41. It is noted that the position of the notch 43 is not limited to the corner as illustrated by the first corner C1, and the notch 43 may be disposed on the corner opposite to the first corner C1 at the left end 41. In this way, the position of the notch 43 in the circuit protection device 300 may be adjusted depending on the process requirements, which has operational freedom in the process.

Figure 8:
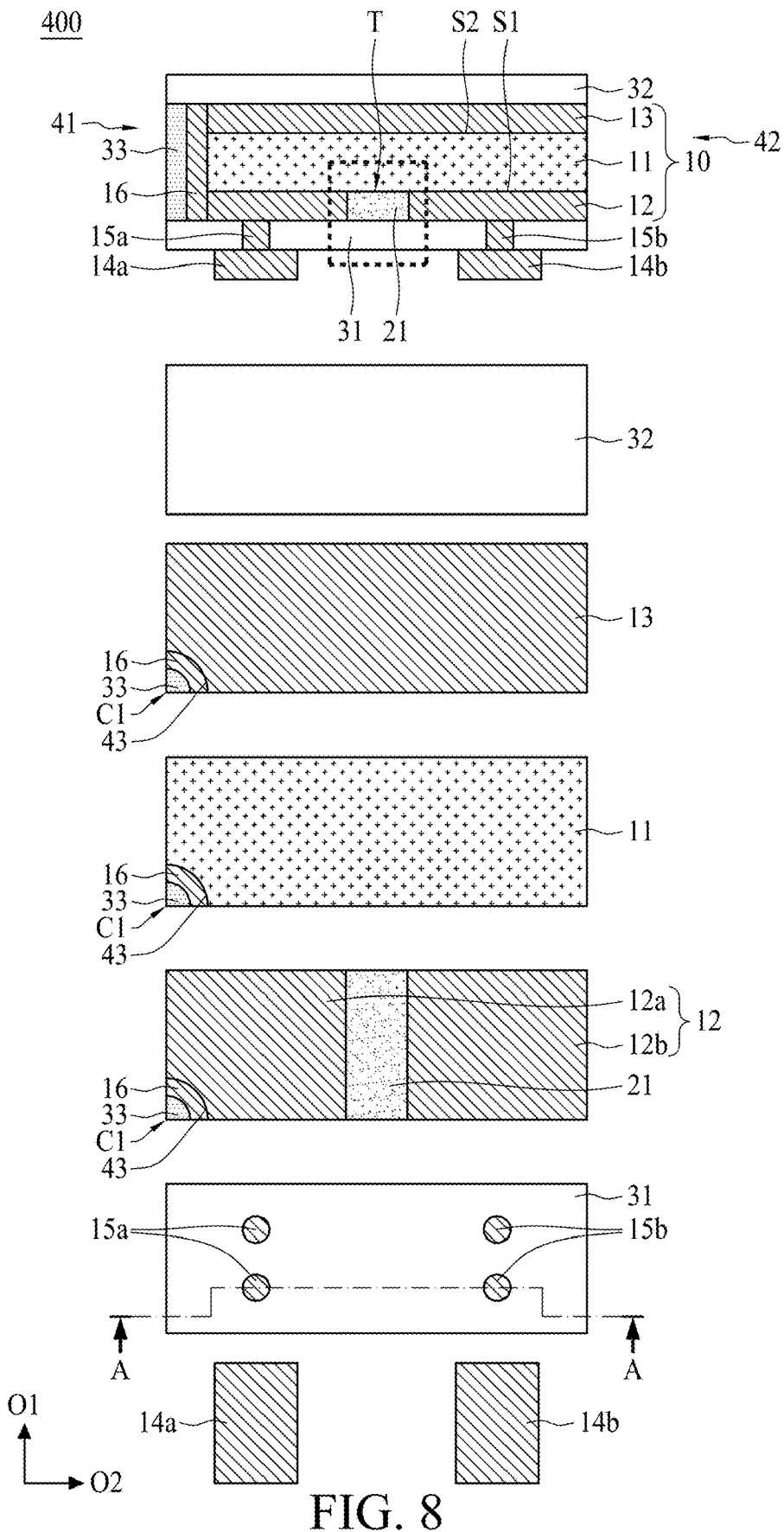
FIG. 8 shows a cross-sectional view of a circuit protection device and top views illustrating each layer of the circuit protection device in accordance with a fourth aspect of the present invention.

Please refer to FIG. 8, it shows a cross-sectional view of a circuit protection device 400 and top views illustrating each layer of the circuit protection device 400 in accordance with a fourth aspect of the present invention. The cross-sectional view of the circuit protection device 400 is obtained by taking along the dashed line AA after assembly of all layers. In FIG. 8, the temperature sensitive resistor element 10, the PTC layer 11, the first electrically conductive layer 12, the first electrically conductive block 12a, the second electrically conductive block 12b, the second electrically conductive layer 13, the first electrode 14a, the second electrode 14b, the first via 15a, the second via 15b, the dielectric layer 21, the trench T, the first electrically insulating layer 31, the second electrically insulating layer 32, the extension of the notch 43, the conductive member 16, the electrically insulating member 33, materials and the distance ratio are the same as described in FIG. 1, and are not described in detail. Compared with FIG. 1, the notch 43 in FIG. 8 is disposed on the corners of the first electrically conductive layer 12, the PTC layer 11, and the second electrically conductive layer 13. More specifically, in FIG. 8, the notch 43 of the circuit protection device 400 is only disposed at the left end 41, and locates at the first corner C1 of the left end 41. It is noted that the position of the notch 43 is not limited to the corner as illustrated by the first corner C1, and the notch 43 may be disposed on the corner opposite to the first corner C1 at the left end 41. In this way, the present disclosure enhances electrical insulation of the circuit protection device 400 through the electrically insulating member 33 on the notch 43, and the position of the notch 43 may further be adjusted depending on the process requirements, which has operational freedom in the process.

Figure 9:
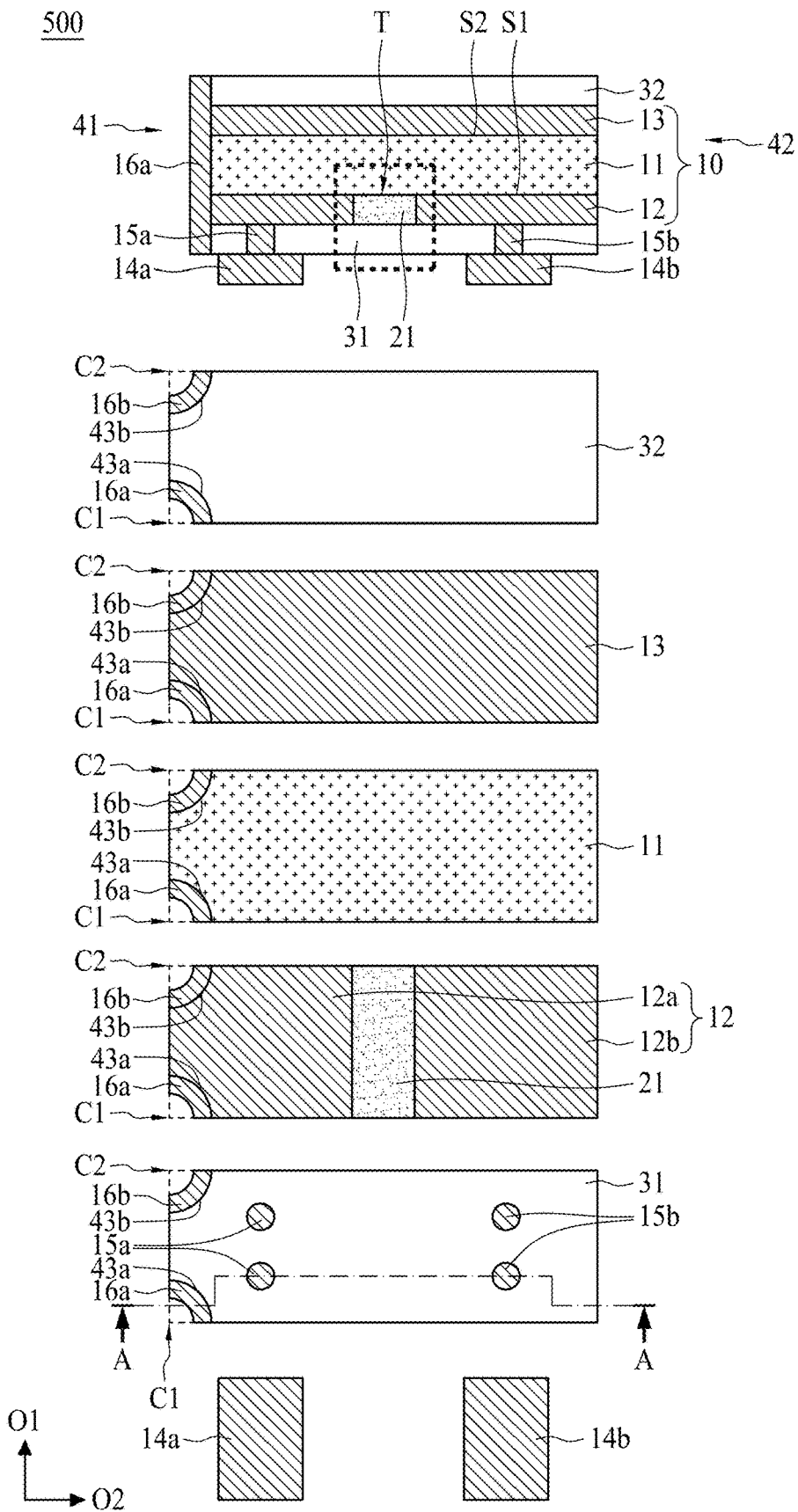
FIG. 9 shows a cross-sectional view of a circuit protection device and top views illustrating each layer of the circuit protection device in accordance with a fifth aspect of the present invention.

Please refer to FIG. 9, it shows a cross-sectional view a circuit protection device 500 and top views illustrating each layer of the circuit protection device 500 in accordance with a fifth aspect of the present invention. The cross-sectional view of the circuit protection device 500 is obtained by taking along the dashed line AA after assembly of all layers. In FIG. 9, the temperature sensitive resistor element 10, the PTC layer 11, the first electrically conductive layer 12, the first electrically conductive block 12a, the second electrically conductive block 12b, the second electrically conductive layer 13, the first electrode 14a, the second electrode 14b, the first via 15a, the second via 15b, the dielectric layer 21, the trench T, the first electrically insulating layer 31, the second electrically insulating layer 32, the extension of the notch, the conductive member, materials and the distance ratio are the same as described in FIG. 7, and are not described in detail. Compared with FIG. 7, the number of the notch in FIG. 9 is different. In FIG. 9, the circuit protection device 500 has two corners at the left end 41, that is, a first corner C1 and a second corner C2, respectively. The first corner C1 and the second corner C2 is at opposite ends of the left end 41. A first notch 43a is disposed on the first corner C1, and a second notch 43b is disposed on the second corner C2. Correspondingly, a first conductive member 16a may be disposed on the first notch 43a, and a second conductive member 16b may be disposed on the second notch 43b. Compared with FIG. 7, the structure at the left end 41 in FIG. 9 has a symmetric design, such as the symmetric first corner C1 and second corner C2, the symmetric first notch 43a and second notch 43b, and the symmetric first conductive member 16a and second conductive member 16b. Such symmetric design is beneficial to the structural strength of the circuit protection device. For example, thermal expansion is uniform at the left end 41 of the circuit protection device 500 if heated, and the structure may remain intact without cracks or other damages under high temperature.

Figure 10:
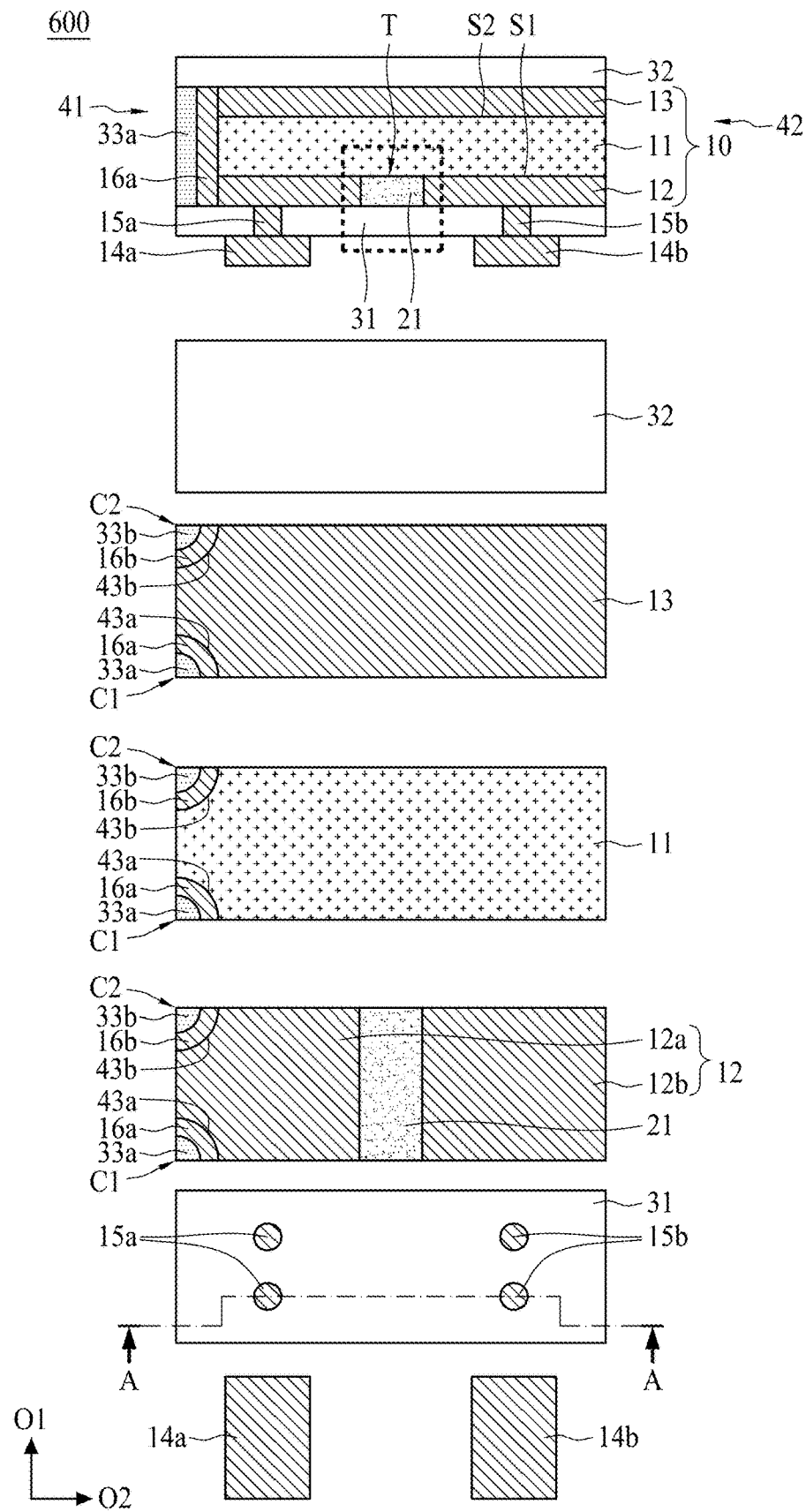
FIG. 10 shows a cross-sectional view of a circuit protection device and top views illustrating each layer of the circuit protection device in accordance with a sixth aspect of the present invention.

Please refer to FIG. 10, it shows a cross-sectional view of a circuit protection device 600 and top views illustrating each layer of the circuit protection device 600 in accordance with a sixth aspect of the present invention. The cross-sectional view of the circuit protection device 600 is obtained by taking along the dashed line AA after assembly of each layer. In FIG. 10, the temperature sensitive resistor element 10, the PTC layer 11, the first electrically conductive layer 12, the first electrically conductive block 12a, the second electrically conductive block 12b, the second electrically conductive layer 13, the first electrode 14a, the second electrode 14b, the first via 15a, the second via 15b, the dielectric layer 21, the trench T, the first electrically insulating layer 31, the second electrically insulating layer 32, the first conductive member 16a, the second conductive member 16b, materials and the distance ratio are the same as described in FIG. 9, and are not described in detail. Compared with FIG. 9, the extension of the notch in FIG. 10 is different. In FIG. 10, the circuit protection device 600 has two corners at the left end 41, that is, the first corner C1 and the second corner C2, respectively. The first corner C1 and the second corner C2 is at opposite ends of the left end 41. The first notch 43a is disposed on the first corner C1, and the second notch 43b is disposed on the second corner C2. However, the first notch 43a extends to the first electrically conductive layer 12, the PTC layer 11 and the second electrically conductive layer 13 sequentially. The extension of the first notch 43a stops at the first electrically conductive layer 12 and the second electrically conductive layer 13, and therefore no notches are formed on the first electrically insulating layer 31 and the second electrically insulating layer 32. The configuration of the second notch 43b is the same as the configuration of the first notch 43a. Correspondingly, the first conductive member 16a may be disposed on the first notch 43a, and the second conductive member 16b may be disposed on the second notch 43b. The first conductive member 16a, the bottom insulating layer (the first electrically insulating layer 31) and the top insulating layer (the second electrically insulating layer 32) together form recessive space for accommodation for a first electrically insulating member 33a. The second conductive member 16b, the bottom insulating layer (the first electrically insulating layer 31) and the top insulating layer (the second electrically insulating layer 32) together form recessive space for accommodation for a second electrically insulating member 33b. Besides the symmetric design of the notches 43a/43b, the extension of the notches 43a/43b is further limited to one side of the temperature sensitive resistor element 10 of the circuit protection device 600. Correspondingly, the circuit protection device 600 may be packaged with the first electrically insulating member 33a and the second electrically insulating member 33b, thereby enhancing electrical insulation from the influence of environmental factors.

To verify the embodiments of the present disclosure, please see experimental data of the embodiments in Table 1 and Table 2 as shown below.

TABLE 1

| Aspect | Group | Endurable Voltage (V) | | | | | | | | | |
|---|---|---|---|---|---|---|---|---|---|---|---|
| | | 6 | 8 | 9 | 12 | 16 | 20 | 24 | 30 | 33 | 36 |
| 1 | C1 | O | O | O | O | O | O | O | X | X | X |
|   | E1 | O | O | O | O | O | O | O | O | O | X |
| 2 | C2 | O | O | O | O | O | O | X | X | X | X |
|   | E2 | O | O | O | O | O | O | O | X | X | X |
| 3 | C3 | O | O | O | O | X | X | X | X | X | X |
|   | E3 | O | O | O | O | O | X | X | X | X | X |
| 4 | C4 | O | O | O | O | O | X | X | X | X | X |
|   | E4 | O | O | O | O | O | O | X | X | X | X |
| 5 | C5 | O | O | O | O | O | X | X | X | X | X |
|   | E5 | O | O | O | O | O | O | O | O | O | X |
| 6 | C6 | O | O | O | O | O | O | O | X | X | X |
|   | E6 | O | O | O | O | O | O | O | O | O | X |

As shown in Table 1, the aspect 1 (the first aspect) to aspect 6 (the sixth aspect) corresponds to the circuit protection devices in FIG. 1 and FIG. 6 to FIG. 10. There are one embodiment of the present disclosure and one comparative embodiment in each aspect. The difference between the comparative embodiments C1-C6 and the embodiments E1-E6 focuses on the dielectric layer 21. The comparative embodiments C1-C6 do not have the dielectric layers 21, and the embodiments E1-E6 have the dielectric layers 21. For example, the circuit protection device 100 in FIG. 1 is implemented in the embodiment E1, and the circuit protection device 100 with no dielectric layers 21 is implemented in the comparative embodiment C1. Accordingly, the test for endurable voltage is performed on each aspect, and the voltage to be tested ranges from 6V to 36V. The so-called "test for endurable voltage" refers to a cycle life test, each cycle of which includes applying a specific voltage for 10 seconds and turning it off for 60 seconds (i.e., on: 10 seconds; off: 60 seconds). 100 cycles are performed in the cycle life test, thereby observing whether the circuit protection device is burnt out or not. As shown in Table 1, "O" means that the circuit protection device passes the test for endurable voltage and is not burnt out; and "X" means that the circuit protection device fails the test for endurable voltage and is burnt out.

SMD circuit protection device with a size model (or form factor) 0402 is selected to be tested in the experiment. Generally, the length of "0402" ranges from about 0.85 mm to about 1.15 mm, and the width of it ranges from about 0.35 mm to about 0.65 mm. In the experiment, "0402" to be tested has a size about 1.1 mm×0.61 mm.

The results show that all the embodiments E1-E6 are better than the comparative embodiments C1-C6. For example, the embodiments E1-E6 have the dielectric layers 21, by which the endurable voltage ranges from 6V up to 33V. In contrast, in the absence of the dielectric layer 21, the endurable voltage of the comparative embodiments C1-C6 ranges from 6V to 24V. In other words, the endurable voltage can be significantly improved if the dielectric layer 21 is filled in the trench T. Moreover, the embodiments E1, E5 and E6 has the best performance, the endurable voltage of which is enhanced up to 33V. The embodiment E1 corresponds to the circuit protection device 100 in FIG. 1, and the embodiment E6 corresponds to the circuit protection device 600 in FIG. 10. The embodiments E1 and E6 have symmetric notches, and their conductive members are covered with the electrically insulating materials (i.e., the electrically insulating member 33, first electrically insulating member 33a and second electrically insulating member 33b). In this way, the influence of high temperature or other environmental factors can be effectively blocked owing to such design. The embodiment E5 has a pair of symmetric notches which may improve the structural strength as described above, although its conductive member (i.e., the first conductive member 16a and second conductive member 16b) is not covered with the electrically insulating materials.

In addition, the present disclosure shows that the width of the trench T (i.e., the distance D, first distance D1 and second distance D2) can be adjusted for further enhancing the endurable voltage of the embodiments, and the embodiment E1 shown in Table 1 is selected to be tested

TABLE 2

| Distance (mm) | Distance Ratio (%) | Endurable Voltage (V) | | | | | | | | | | |
|---|---|---|---|---|---|---|---|---|---|---|---|---|
| | | 6 | 8 | 9 | 12 | 16 | 20 | 24 | 30 | 33 | 36 | 48 | 60 |
| 0.05 | 4.55% | X | X | X | X | X | X | X | X | X | X | X | X |
| 0.08 | 7.27% | O | X | X | X | X | X | X | X | X | X | X | X |
| 0.10 | 9.09% | O | O | X | X | X | X | X | X | X | X | X | X |
| 0.15 | 13.64% | O | O | O | X | X | X | X | X | X | X | X | X |
| 0.20 | 18.18% | O | O | O | O | X | X | X | X | X | X | X | X |
| 0.25 | 22.73% | O | O | O | O | O | O | X | X | X | X | X | X |
| 0.30 | 27.27% | O | O | O | O | O | O | O | O | X | X | X | X |
| 0.35 | 31.82% | O | O | O | O | O | O | O | O | O | X | X | X |
| 0.40 | 36.36% | O | O | O | O | O | O | O | O | O | O | X | X |
| 0.50 | 45.45% | O | O | O | O | O | O | O | O | O | O | X | X |
| 0.60 | 54.55% | X | X | X | X | X | X | X | X | X | X | X | X |

As shown in Table 2, "Distance" in the column corresponds to the distance D, the first distance D1 and the second distance D2 in FIG. 3a to FIG. 5c. "Distance Ratio" refers to the ratio of the distance D (or the first distance D1 or the second distance D2) to the long side L. For example, if the distance is 0.05 mm, the distance ratio is calculated by dividing 0.05 by 1.1, which is about 4.55%. In Table 1, the distance D in the trench T is 0.35 mm, and this value is taken as the median to define the range (i.e., mm to 0.6 mm) to be tested.

In Table 2, the circuit protection device cannot withstand the applied voltage of 6V if the distance is shorter than 0.08 mm. That is, the first electrically conductive block 12a and the second electrically conductive block 12b are so close that the electrical insulation is insufficient even if the dielectric layer 21 exists therebetween. Besides, if the distance is too close which makes the width of the trench T narrower, it becomes difficult to fill the dielectric layer 21 in the trench T. If the distance is longer than 0.5 mm, the total top-view surface of the first electrically conductive block 12a and the second electrically conductive block 12b is too small to be properly aligned with the first via 15a and the second via 15b, and the electrical resistance is also relatively higher.

Generally, in circuit protection device 100, the distance D of the trench T is set to about 0.35 mm in respect of the size model 0402. It is observed that the endurable voltage is enhanced and up to 36V if the distance is adjusted to 0.4 mm to 0.5 mm while filling the dielectric layer 21. However, different size models have different sizes (long side×short side), and therefore the present disclosure calculates the distance D (relative to the long side) of the trench T in percentage, that is, the distance ratio. The distance ratio may apply to other size models and obtain the same technical effects.

More specifically, in Table 1 and Table 2, size model 0402 is taken as the sample for verification of endurable voltage. In fact, the present disclosure may apply to other models, such as 0603, 0805, 1206 or 1210, and obtain the same technical effects. The size model 0603 has a length ranging from about 1.4 mm to about 1.8 mm, and a width ranging from about 0.6 mm to about 1 mm. The size model 0805 has a length ranging from about 2 mm to about 2.2 mm, and a width ranging from about 1.2 mm to about 1.5 mm. The size model 1206 has a length ranging from about 3 mm to about 3.4 mm, and a width ranging from about 1.5 mm to about 1.8 mm. The size model 1210 has a length ranging from about 3 mm to about 3.43 mm, and a width ranging from about 2.35 mm to about 2.8 mm. As to the distance ratio, it is fully discussed and the preferred range is listed above, especially in the context of FIG. 1, and is not described in detail herein.

The above-described embodiments of the present invention are intended to be illustrative only. Numerous alternative embodiments may be devised by persons skilled in the art without departing from the scope of the following claims.

What is claimed is:

1. A circuit protection device, comprising:
    a temperature sensitive resistor element having a positive temperature coefficient (PTC) layer, a first electrically conductive layer and a second electrically conductive layer, wherein:
        the PTC layer has a first surface and a second surface opposite to the first surface;
        the first electrically conductive layer is disposed on the first surface, and has a first electrically conductive block, a second electrically conductive block and a trench, wherein the first electrically conductive block is electrically isolated and spaced apart from the second electrically conductive block at a distance by the trench; and
        the second electrically conductive layer is disposed on the second surface;
    a dielectric layer disposed in the trench, wherein:
        the dielectric layer extends along a first direction between the first electrode and the second electrode, and the first direction is parallel to the first electrode and the second electrode; and
        the trench has a bottom surface and a sidewall, and the bottom surface extends on the first surface and non-perpendicularly connects to the sidewall;
    a first electrically insulating layer disposed on the first electrically conductive layer and covering the dielectric layer;
    a first electrode and a second electrode disposed on the first electrically insulating layer, and electrically connected to the first electrically conductive block and the second electrically conductive block, respectively; and
    a first conductive member, a left end and a right end opposite to the left end, wherein the left end has a first notch extending across the first electrically conductive layer, the PTC layer and the second electrically conductive layer, and the first conductive member is disposed in the first notch.

2. The circuit protection device of claim 1, wherein the dielectric layer is in direct contact with the sidewall and extends along the first direction, wherein the sidewall and the bottom surface are entirely covered by the dielectric layer, and the trench is entirely filled with the dielectric layer.

3. The circuit protection device of claim 1, wherein the dielectric layer is in direct contact with the sidewall and extends along the first direction, wherein the bottom surface is partially covered by the dielectric layer, and a gap is formed in the trench.

4. The circuit protection device of claim 1, wherein the dielectric layer is in direct contact with the sidewall and extends along the first direction, wherein the sidewall and the bottom surface are entirely covered by the dielectric layer, and a gap is formed in the trench.

5. The circuit protection device of claim 1, further comprising a first electrically insulating member entirely covering the first conductive member.

6. The circuit protection device of claim 5, wherein the temperature sensitive resistor element further comprises a second conductive member, wherein the left end has a second notch extending across the first electrically conductive layer, the PTC layer and the second electrically conductive layer, and the second conductive member is disposed in the second notch.

7. The circuit protection device of claim 6, further comprising a second electrically insulating member entirely covering the second conductive member.

8. The circuit protection device of claim 7, wherein the left end has a first corner and a second corner located on opposite ends of the left end, wherein the first notch is disposed on the first corner, and the second notch is disposed on the second corner.

9. The circuit protection device of claim 8, further comprising a second electrically insulating layer disposing on the second electrically conductive layer.

10. The circuit protection device of claim 1, wherein the first electrically conductive layer has a long side parallel to the distance, wherein if the total length of the long side is calculated as 100%, the distance ranges from 7% to 46%.

11. The circuit protection device of claim 1, wherein the distance ranges from 0.08 mm to 0.5 mm.

12. The circuit protection device of claim 1, wherein the dielectric strength of the dielectric layer is higher than the dielectric strength of the first electrically insulating layer.

13. The circuit protection device of claim 12, wherein the dielectric layer has a material selected from the group consisting of epoxy resin, polyester resin, polyamide resin, phenolic resin, epoxy resin with glass fiber or inorganic filler, phenolic resin with glass fiber or inorganic filler, polyurethane resin, polycyanate resin, maleimide resin, polyolefin resin, polyphenylene oxide resin, silicone polymer, acrylic resin, photopolymer resin, inorganic glue, and combinations thereof.

14. The circuit protection device of claim 13, wherein the dielectric layer is made of the epoxy resin with inorganic filler, and the first electrically insulating layer is made of epoxy resin.

* * * * *